United States Patent [19]

Williams et al.

[11] Patent Number: 4,773,340
[45] Date of Patent: Sep. 27, 1988

[54] SUBSOIL APPLICATOR

[75] Inventors: Robert A. Williams; Donald E. Williams; Forrest E. Robertson, all of Garden City, Kans.

[73] Assignee: Acra Plant, Inc., Garden City, Kans.

[21] Appl. No.: 944,661

[22] Filed: Dec. 19, 1986

[51] Int. Cl.$^4$ .............................................. A01C 23/02
[52] U.S. Cl. ......................................... 111/7; 172/699
[58] Field of Search ................. 111/6, 7, 86, 85, 73, 111/80, 1; 405/176, 269, 36, 38; 172/382, 699, 700, 724, 730–733

[56] References Cited

U.S. PATENT DOCUMENTS

| | | | |
|---|---|---|---|
| 2,849,969 | 9/1958 | Taylor | 111/7 |
| 3,188,988 | 6/1965 | Peck | 111/7 |
| 3,296,985 | 1/1967 | Shelton | 111/7 |
| 4,033,271 | 7/1977 | Williams et al. | 111/7 |
| 4,446,927 | 5/1984 | Robertson | 172/713 |
| 4,592,294 | 6/1986 | Dietrich et al. | 111/7 |
| 4,616,580 | 10/1986 | Moore et al. | 111/7 |
| 4,638,748 | 1/1987 | Kopecky | 111/73 |

FOREIGN PATENT DOCUMENTS

| | | | |
|---|---|---|---|
| 217205 | 3/1957 | Australia | 172/732 |
| 904577 | 11/1945 | France | 172/700 |
| 35151 | 1/1965 | German Democratic Rep. | 111/7 |
| 7409495 | 7/1974 | Netherlands | 111/7 |

OTHER PUBLICATIONS

Anon., *Adams Tillage Tools* (catalog), Jan. 1979, p. 16, (address unknown), copy in 172/699.
Anon, *Fertilizer Tools Cut Your Production Costs* (Sales leaflet), ACRA-Plant Sales, Inc. P.O. Box 1114, Garden City, Kansas, 67846, printed in 1982, copy in 111/7.

*Primary Examiner*—James R. Feyrer
*Attorney, Agent, or Firm*—Hovey, Williams, Timmons & Collins

[57] ABSTRACT

The applicator comprises a relatively thin, streamlined knife blade adapted to be positioned with its longitudinal axis inclined upwardly and rearwardly during use with a leading edge of the applicator slicing through the subsoil and a lowermost and forwardmost point thereof penetrating the subsoil for the progressive entry of a wedge immediately behind the point which firms up and smooths the lowermost portion of the slice being created by the knife. Upwardly and rearwardly inclined, streamlined wings at the bottom of the blade but above the wedge project beyond the rear of the wedge to define a pocket into which anhydrous ammonia or other substances can be deposited. In one embodiment, the wings commence at the point and diverge rearwardly therefrom at a faster rate than the wedge to provide increased surface area for lifting and fracturing the soil as the knife moves therethrough, providing particular relief in root-bound subsoils. In a second embodiment especially suited for soils which are not self-closing, a pair of outwardly projecting closing fins are provided above and generally rearwardly of the wings to cause the rearwardly flowing soil to be directed downwardly and rearwardly into the slit and around and behind the knife, thus promoting closing of the slit and retention of the deposited substance.

19 Claims, 4 Drawing Sheets

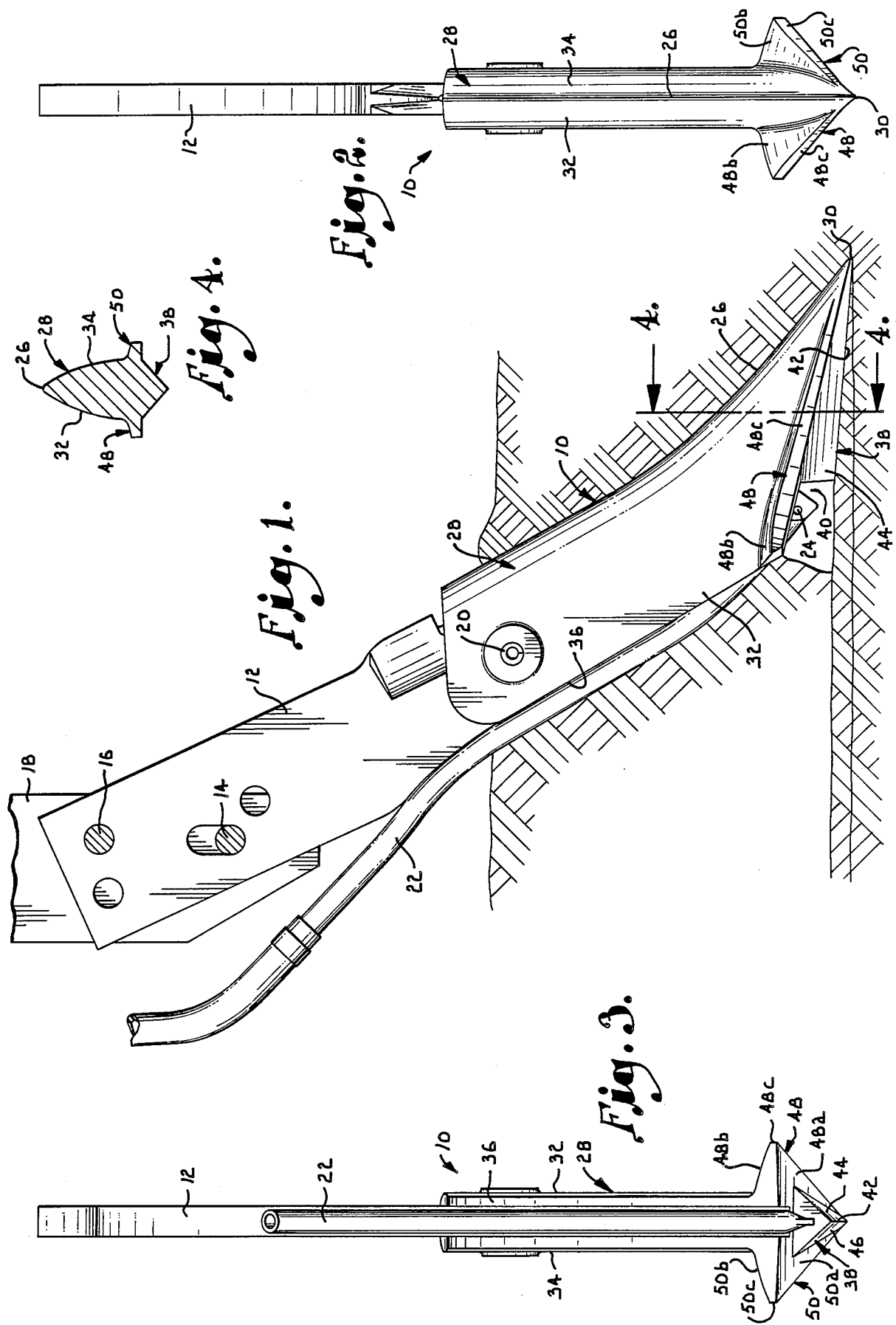

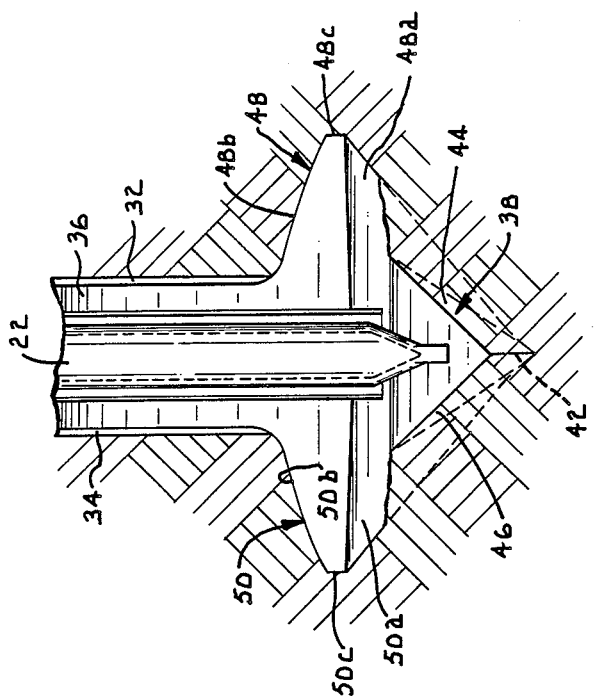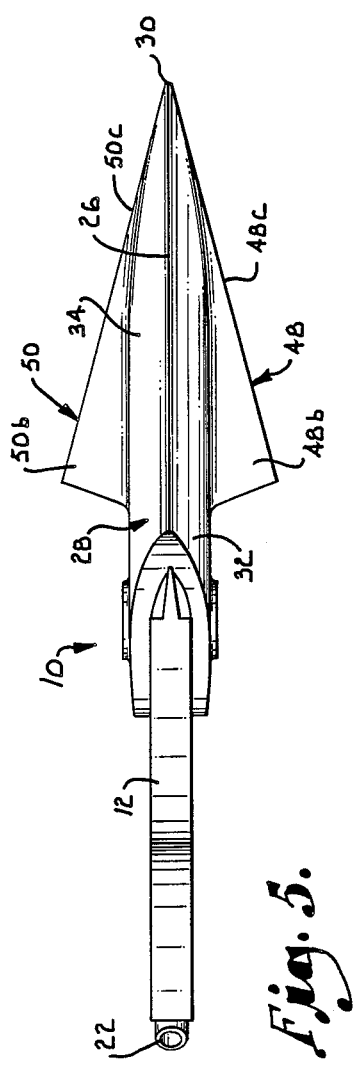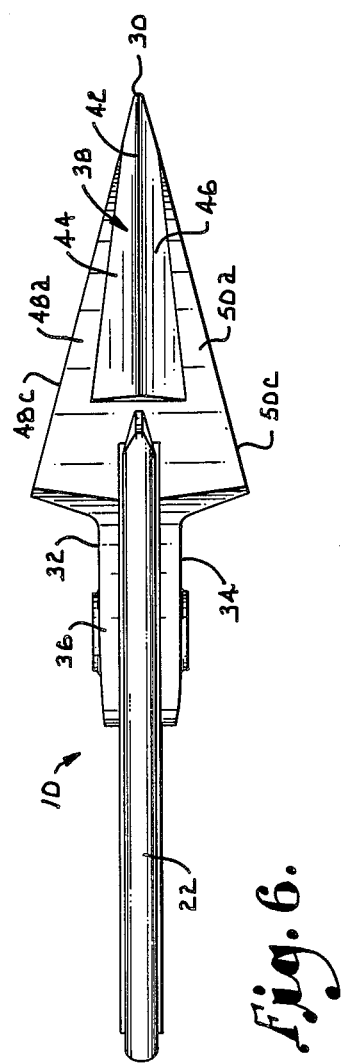

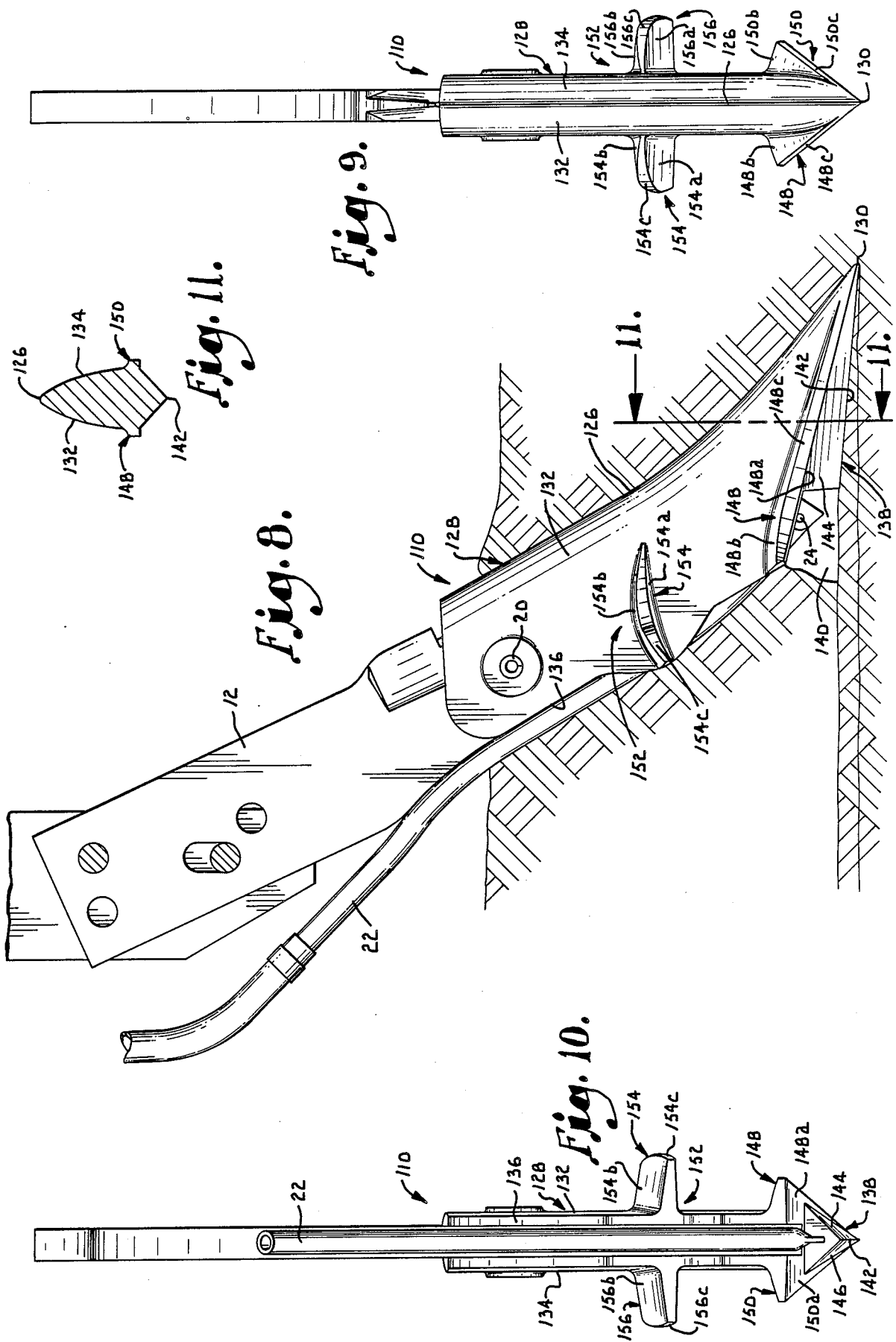

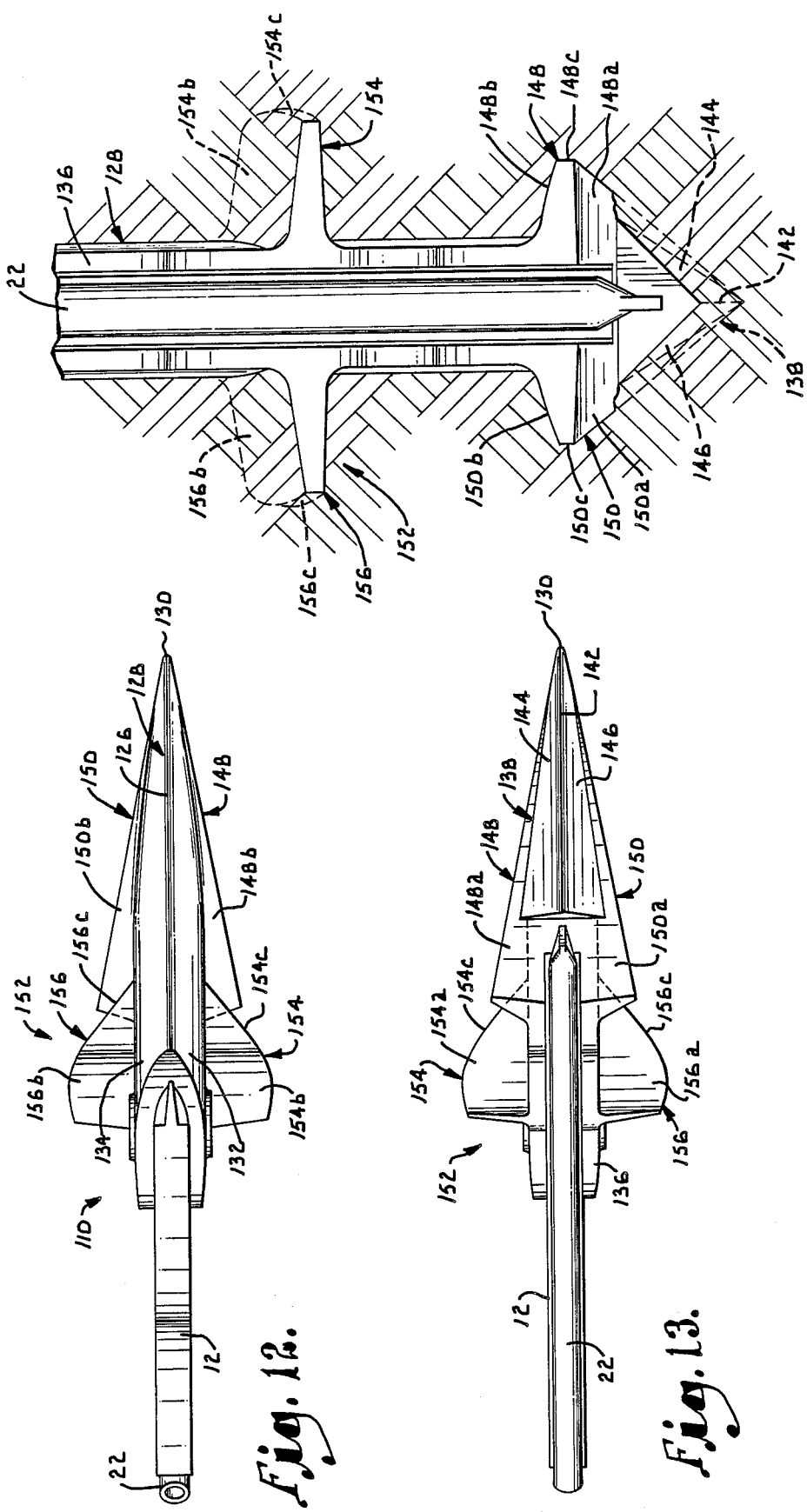

SUBSOIL APPLICATOR

TECHNICAL FIELD

This invention relates to knife applicators for injecting substances such as pesticides, herbicides and fertilizers into the soil and, more particularly, to improvements in the applicator disclosed in U.S. Pat. No. 4,033,271 assigned to the assignee of the present invention.

BACKGROUND

The knife applicator disclosed in U.S. Pat. No. 4,033,271 is designed to slice cleanly through the subsoil with a minimum of soil disturbance while at the same time preparing the soil to receive and trap substances deposited by the knife. This action of the applicator in disturbing the soil to the minimum possible extent also encourages the soil to close the slit by its own inherent resiliency.

The applicator of the U.S. Pat. No. 4,033,271 has been proven to be extremely efficient at serving its intended functions. However, in some conditions, there is room for further improvement. For example, in fields where the subsoil is not seasonally tilled and turned over, such as those producing grass crops, alfalfa, or pastureland, there is frequently a massive root system existing below the surface of the ground which could benefit from periodic aeration and relief, as well as nutritional feedings, to avoid a root-bound condition. The subsoil in those instances requires more fracturing or shattering than might be possible with the knife of the U.S. Pat. No. 4,033,271.

Accordingly, one important object of the present invention is to provide an improvement on the knife applicator of the U.S. Pat. No. 4,033,271 which makes it more suitable for use in those fields where greater subsoil shattering is desired and root systems established by non-replanted surface crops could benefit from subsoil relief and cultivation, as well as the injection of growth-promoting substances. In this respect, the present invention contemplates maintaining most of the constructional and relational features of the knife unchanged from that disclosed in the U.S. Pat. No. 4,033,271 while modifying the oppositely projecting wings thereof such that the wings are significantly wider than in the prior knife, are thicker than the prior wings, and converge clear to the forwardmost point of the knife in order to achieve the intended benefits.

It has also been found that in some soils it may be more difficult to close the slit or slice produced by the moving applicator knife than in others; that is, in some soil conditions there may be a sufficient lack of inherent resiliency in the soil that the slit will not be as self-closing as in other soils. Accordingly, another important object of the present invention is to provide another embodiment of the knife having special closing fins above and behind the side wings of the knife that encourage the soil lifted by the wings to be directed back downwardly toward the bottom of the slit and to be tucked in behind the knife so as to close off the slit. The fins are strategically positioned so as to avoid a counterproductive boiling or squeezing action in the soil which might occur if the fins were directly above and overlying the wings, in which case the wings would be pushing up on the same soil that the fins were attempting to push down. The span of the fins from side to side exceeds that of the wings so as to further reduce problems tending to arise through counteravailing forces in the wings and the fins.

BRIEF DESCRIPTION OF THE DRAWINGS

FIG. 1 is a side elevational view of an applicator knife constructed in accordance with principles of the present invention and illustrated in operating use;

FIG. 2 is a front elevational view thereof;

FIG. 3 is a rear elevational view thereof;

FIG. 4 is a transverse cross-sectional view of the knife taken substantially along line 4—4 of FIG. 1;

FIG. 5 is a top plan view of the installed knife;

FIG. 6 is a bottom plan view thereof;

FIG. 7 is an enlarged, fragmentary rear elevational view of the knife as it moves through the subsoil;

FIG. 8 is a side elevational view of a second embodiment of the present invention in operating use;

FIG. 9 is a front elevational view thereof;

FIG. 10 is a rear elevational view thereof;

FIG. 11 is a transverse cross-sectional view of the second embodiment of the knife taken substantially along line 11—11 of FIG. 8;

FIG. 12 is a top plan view of the second embodiment;

FIG. 13 is a bottom plan view thereof; and

FIG. 14 is an enlarged, fragmentary rear elevational view of the second knife embodiment as the latter moves through the subsoil.

DETAILED DESCRIPTION

Embodiment of FIGS. 1-7

The knife 10 is mounted on an elongated shank 12 attached at its upper end by bolts 14 and 16 to a depending bracket 18 of an implement (not shown) drawn across a field to be worked. Knife 10 is in the nature of a shoe that slips onto the lower end of the shank 12 and is affixed in that position by cooperating internal structures and by a transverse roll pin 20. Although not illustrated in particular detail, it will be understood that the knife 10 is generally V-shaped in horizontal cross-section so as to present an internal cavity which is open along its rear extremity to facilitate insertion and removal of the shank 12. A delivery tube 22 runs along the back of the knife 10 and connects with a source of the substance to be injected into the subsoil, the tube 22 terminating at its lower end in one or more outlets 24.

The knife 10 is of streamlined construction, having a longitudinal axis that is inclined upwardly and rearwardly, and a forwardmost, leading, longitudinally extending and slightly concave slicing edge. The edge 26 extends the full length of the knife 10.

The body of the knife 10 comprises what may be thought of as a relatively thin blade 28 having the slicing edge 26 along its front extremity and a sharp piercing point 30 at its lowermost and forwardmost extremity. The blade 28 has opposite sides 32 and 34 which initially diverge from the slicing edge 26 and then extend essentially in parallelism rearwardly until the rear 36 of the blade is reached.

The knife 10 also includes a soil-firming wedge 38 along the bottom of the blade 28. The wedge 38 commences at the point 30 and extends rearwardly therefrom, progressively increasing in width as the rear 36 is approached. The wedge 38 terminates forwardly of the rear 36 so as to define a pocket 40 beneath blade 28 and behind wedge 38 in which the outlets 24 of the dispensing tube 22 are located. The wedge 38 has a symmetrically located, fore-and-aft extending, soil-creasing edge 42 that leads rearwardly from the point 30 to the pocket 40, and is further provided with a pair of opposite, triangular faces 44 and 46 that diverge upwardly and outwardly from the edge 42 to the bottom of the blade 28.

The blade 28 is provided with a pair of upwardly and rearwardly inclined, laterally outwardly projecting wings 48 and 50 on opposite sides 32,34. The wings 48,50 commence at the point 30 and diverge rearwardly therefrom at an included angle of approximately 30° until the rear 36 of the blade 28 is reached. Such angle of divergence of the wings 48,50 is slightly greater than the rate of increasing width of the wedge 38 such that wings 48,50 overhang and project laterally outwardly beyond the wedge 38 all along the length of the latter and to a progressively increasing extent as the rear 36 of the blade 28 is approached. The wings 48,50 have bottom surfaces 48a, 50a respectively, which intersect with the wedge faces 44,48 along the length of wedge 38 and which merge together to form a single common bottom surface across the knife rearwardly of the wedge 38 in the area of the pocket 40. Likewise, the wings 48,50 have corresponding top surfaces 48b and 50b which are of triangular configuration and which intersect the corresponding sides 32,34 of blade 28 at upwardly and rearwardly inclined lines of intersection. The top surfaces 48b,50b slope slightly downwardly and outwardly away from the sides 32,34 and terminate at laterally outermost, upright side margins 48c and 50c of the wings 48,50 respectively. The wings 48,50 progressively increase in thickness as the rear 36 of blade 28 is approached such that each of the side margins 48c,50c is generally triangular in side elevation. Top surfaces 48b,50b are downturned slightly at their rearmost extents as shown perhaps best in FIG. 1.

In use, the knife 10 is preferably oriented as illustrated in FIG. 2 so that the creasing edge 42 of the wedge 38 is inclined upwardly and rearwardly to a slight extent, rather than being perfectly horizontal. As the knife 10 advances, the slicing edge 26 neatly divides the subsoil so that the blade 28 can pass therethrough with a minimum of drag and soil disturbance. This is important in order that the slice created by the knife 10 will be encouraged as much as possible to close automatically through the inherent resiliency of the soil.

As the slice begins to be produced at point 30, the wedge 38 immediately engages the lowermost portions of the sides of the slice and, with faces 44,46, progressively applies a firming and smoothing action to such portions to impart a V-shaped configuration to the lowermost portions of the slice and to help eliminate the existence of loose, cloddy material at that location.

Because of the smoothing, firming, and maintaining action provided by the wedge 38, the pocket 40 is well defined, and substances discharged through outlets 24 are trapped within the pocket in contact with the lower side portions of the slice. With the wings 48,50 overlying the pocket 40, gaseous substances from knife 10 are well trapped against escape to promote applicating efficiency and prevent untoward escape of the gas to the atmosphere.

The upward and rearward inclination of the wings 48,50 help hold the knife 10 down in the soil as the knife is advanced. With the extra width for the wings 48,50 compared to that available in the applicator of U.S. Pat. No. 4,033,271, this type of retaining action is augmented and increased. Furthermore, it has been found that by commencing the wings 48,50 at the point 30, even though wings 48,50 are significantly wider at their rear extremities than in the past, such increased width does not result in untoward wear, apparently due to the lack of abrupt leading surfaces on the outwardly flaring wing margins 48c, 50c.

The extra width of the wings 48,50 is also significant for the extra fracturing action it produces during movement of the wings through the subsoil. In this respect, it will be understood that the top surfaces 48b,50b of the wings 48,50 exert significant upward pressure as the knife 10 moves forwardly through the subsoil, and to the extent the wings 48,50 are wider than those in the prior knife of the U.S. Pat. No. 4,033,271, an extra amount of upward pressure and thus soil fracturing action is obtained. Furthermore, in sod or other fields where substantial, well-established root systems are present, the additional width of the wings 48,50 can be especially helpful in relieving what might otherwise be a root-bound condition thus promoting plant growth. Additionally, the extra width of the wings 48,50 is helpful in producing a larger cavity in the subsoil so as to accept a greater volume of the applied substance.

Embodiment of FIGS. 8–14

The knife 110 of FIGS. 8–14 is similar in most respects to the knife of FIGS. 1–7, but is also specially designed for use in soils which tend not to be self-closing, the knife 110 in this respect being provided with means for helping the slice to close, as will hereinafter be described. As with the knife 10, the knife 110 is adapted to be mounted on the shank 12 via a roll pin 20 and to be used in connection with a distributing tube 22 having the outlets 24 at its lower end.

The knife 110 includes an elongated blade 128 having an upwardly and rearwardly inclined longitudinally axis and a continuous slicing edge 126 all along its front longitudinal extremity which terminates at its lowermost and forwardmost end in a piercing point 130. As in the first embodiment, the blade 128 has opposite sides 132 and 134 and a rear 136. A triangular wedge 138 along the bottom of the blade 128 is of the same configuration as the wedge 38, commencing at the point 130 and progressively widening as the rear 136 of the blade 128 is approached, defining a pocket 140 at the rearmost extremity of the wedge 138 and beneath the bottom of the blade 128. The wedge 138 has a lowermost edge 142 and opposite triangular faces 144 and 146.

Also like the knife 10, the knife 110 has a pair of oppositely laterally outwardly projecting wings 148 and 150 of the same configuration as the wings 48 and 50, except that the wings 148,150 diverge rearwardly from the point 130 at a smaller included angle than that of the wings 48,50, i.e., at an included angle of approximately 22°. Wings 148,150 are provided with bottom surfaces 148a, 150a, top surfaces 148b,150b, and outermost vertical side margins 148c, 150c.

In addition to the foregoing described components, the knife 110 has a slit closer broadly denoted by the numeral 152 not found on the knife 10. Closer 152 includes a pair of specially shaped and strategically positioned fins 154 and 156 projecting laterally outwardly from opposite sides 132 and 134 of the blade 128 at a position above the wings 148,150 and generally behind the latter. Each of said fins 154,156 is concavo-convex, having concave lower surfaces 154i a and 156a and convex upper surfaces 154b and 156b. Generally speaking, the fins 154,156 are inclined downwardly and rearwardly and are triangular shaped as viewed in plan, terminating in outermost, upright side margins 154c and 156c. The side margins 154c, 156c diverge rearwardly from their intersections with sides 132,134 at an included angle of approximately 80° until a point rearwardly of the wings 148,150 and forwardly of rear 136 is reached, at which point the margins 154c, 156c extend rearwardly in substantial parallelism with one another. It is to be noted that the forwardmost extremities on the fins 154,156 slightly overlie the rearmost portions of the wings 148,150.

In use, the knife 110 is in most respects substantially identical to the knife 10, except that the knife 110 has somewhat less soil fracturing capabilities because of the somewhat narrower wings 148,150, and the closer 152 is provided to assist in reclosing the slice formed by the knife 110 as it moves through the subsoil. It has been found in this repsect that the knife 110 is particularly useful in wet, heavy and sticky soils which tend to stay open rather than loosely tumble back into the slice as the knife moves therethrough. With the closing fins 154 and 156, a downward and rearward pressure is exerted upon the soil as the knife 110 moves forwardly therethrough which tends to cause the soil to tuck in and around behind the blade 128 and down into the slice. At the same time, the lifting action afforded by the upper surfaces 148b,150b of wings 148,150 is helpful in causing the soil to be fractured and to flow upwardly and rearwardly into position behind the blade 128.

With the wings 148,150 providing upward lift to the soil and the fins 154,156 providing downward pressure, there could be a counterproductive boiling and squeezing action of the soil between the closer 152 and and wings 148,150 but for the fact that the closer 152 is positioned primarily behind the wings 148,150 instead of directly above the same. Thus, soil being pushed downwardly by the fins 154,156 is not directed onto the wings 148,150, but rather is encouraged to flow rearwardly of the wings 148,150 into the space vacated by the wings. Also helpful in this respect is the fact that the fins 154,156 are wider than the wings 148,150 such that some of the downward pressure exerted by the fins 154,156 falls outside the lateral dimensions of the wings 148,150.

The strategic positioning of the closing fins 154,158 relative to the wings 148,150 is also important from the standpoint of minimizing wear on the wings 148,150. Again, since the bulk of the downward and inward thrust of the soil by the fins 154,156 is rearwardly of the wings 148,150, the wings 148,150 do not experience forceful abrasive soil action from the fins 154,156. And, soil is not squeezed between the wings 148,150 and the fins 154,156 to wear away the fins 154,156 at an excessive rate.

It should thus be apparent that both of the knives 10 and 110 hereinabove described provide significant improvements in the field of subsoil applicators. It should also be apparent that obvious modifications and variations could be made in the knives 10 and 110 by those skilled in the art without departing from the spirit of the present invention. Accordingly, the present invention should be limited only by the fair scope of the claims which follow.

We claim:

1. In a subsoil applicator knife, the improvement comprising:

an elongated blade having a normally upwardly and rearwardly inclined longitudinal axis and a soil-slicing, longitudinally extending line edge all along the front thereof with respect to the normal path of travel of the knife, said blade being provided with a pair of opposite sides which initially mutually diverge from said edge along the length of the latter and then extend generally predominately fore-and-aft as the rear of the blade is approached;

a soil-penetrating point on said blade at the lowermost and forwardmost extremity of said edge;

an elongated, soil-forming wedge along the bottom of said blade and integral with the latter, said wedge commencing at said point and progressively increasing in width as the rear of the blade is approached until terminating at a rearward location disposed forwardly of the rear of the blade, said wedge having a pair of laterally opposite, triangular faces converging forwardly to said point and converging downwardly and inwardly to a common, lowermost, soil-creasing, fore-and-aft extending edge;

a pair of elongated, fore-and-aft extending wings projecting laterally outwardly from opposite sides of the blade at the intersection of the wedge with the bottom of the blade; and a pair of closing fins projecting laterally outwardly from opposite sides of the blade above said wings and generally rearwardly thereof, said fins progressively widening rearwardly at an inclined angle of approximately 80°.

2. In a subsoil applicator knife, the improvement comprising:

an elongated blade having a normally upwardly and rearwardly inclined longitudinal axis and a soil-slicing, longitudinally extending line edge all along the front thereof with respect to the normal path of travel of the knife, said blade being provided with a pair of opposite sides which initially mutually diverge from said edge along the length of the latter and then extend generally predominately fore-and-aft as the rear of the blade is approached;

a soil-penetrating point on said blade at the lowermost and forwardmost extremity of said edge;

an elongated, soil-forming wedge along the bottom of said blade and integral with the latter, said wedge commencing at said point and progressively increasing in width as the rear of the blade is approached until terminating at a rearward location disposed forwardly of the rear of the blade, said wedge having a pair of laterally opposite, triangular faces converging forwardly to said point and converging downwardly and inwardly to a common, lowermost, soil-creasing, fore-and-aft extending edge;

a pair of elongated, fore-and-aft extending wings projecting laterally outwardly from opposite sides of the blade at the intersection of the wedge with the bottom of the blade; and a pair of closing fins projecting laterally outwardly from opposite sides of the blade above said wings and generally rearwardly thereof, each of said wings having an upwardly and rearwardly inclined upper surface and each of said fins having a downwardly and rearwardly inclined lower surface above the upper surface of the corresponding wing, each of said fins being of generally concavo-convex configuration with said lower surfaces thereof concave and top surfaces thereof convex.

3. In a subsoil knife as claimed in claim 2, wherein said wings commence at said point and progressively increase in width as the rear of the blade is approached until terminating at said rear of the blade, said wings widening at a faster rate that said wedge as the rear of the blade is approached whereby to overhang and project laterally outwardly beyond the wedge to a progressively increasing extent as the rear of the blade is approached.

4. In a subsoil knife as claimed in claim 3, wherein said lower surface of each fin commences at a location spaced rearwardly from said front edge of the blade and slightly forwardly of the rearward termination of said upper surface of the corresponding wing.

5. In a subsoil knife as claimed in claim 4, wherein said fins have laterally outermost side margins which diverge laterally outwardly from opposite sides of the blade as the rear of the blade is approached, said side margins of the fins having portions thereof which are disposed rearwardly of said wings and laterally outwardly beyond the same.

6. In a subsoil knife as claimed in claim 5, wherein said side margins of the fins curve into parallel relationship with one another before the rear of the blade is reached.

7. In a subsoil applicator knife, the improvement comprising:
   an elongated blade having a normally upwardly and rearwardly inclined longitudinal axis and a soil-slicing, longitudinally extending line edge all along the front thereof with respect to the normal path of travel of the knife,
   said blade being provided with a pair of opposite sides which initially mutually diverge from said edge along the length of the latter and then extend generally predominately fore-and-aft as the rear of the blade is approached;
   a soil-penetrating point on said blade at the lowermost and forwardmost extremity of said edge;
   an elongated, soil-firming wedge along the bottom of said blade and integral with the latter,
   said wedge commencing at said point and progressively increasing in width as the rear of the blade is approached until terminating at a rearward location disposed forwardly of the rear of the blade,
   said wedge having a pair of laterally opposite, triangular faces converging forwardly to said point and converging downwardly and inwardly to a common, lowermost, soil-creasing, fore-and-aft extending edge;
   a pair of elongated, fore-and-aft extending wings projecting laterally outwardly from opposite sides of the blade at the intersection of the wedge with the bottom of the blade,
   said wings commencing at said point and progressively increasing in width as the rear of the blade is approached until terminating at said rear of the blade,
   said wings widening at a faster rate than said wedge as the rear of the blade is approached whereby to overhang and project laterally outwardly beyond the wedge to a progressively increasing extent as the rear of the blade is approach,
   a pair of closing fins projecting laterally outwardly from opposite sides of the blade above said wings,
   said wings progressively widening rearwardly at an included angle of approximately 22°,
   said fins progressively widening rearwardly at an included angle of approximately 80°.

8. In a subsoil applicator knife, the improvement comprising:
   an elongated blade having a normally upwardly and rearwardly inclined longitudinal axis and a soil-slicing, longitudinally extending line edge all along the front thereof with respect to the normal path of travel of the knife,
   said blade being provided with a pair of opposite sides which initially mutually diverge from said edge along the length of the latter and then extend generally predominately fore-and-aft as the rear of the blade is approached;
   a soil-penetrating point on said blade at the lowermost and forwardmost extremity of said edge;
   an elongated, soil-firming wedge along the bottom of said blade and integral with the latter,
   said wedge commencing at said point and progressively increasing in width as the rear of the blade is approached until terminating at a rearward location disposed forwardly of the rear of the blade,
   said wedge having a pair of laterally opposite, triangular faces converging forwardly to said point and converging downwardly and inwardly to a common, lowermost, soil-creasing, fore-and-aft extending edge;
   a pair of elongated, fore-and-aft extending wings projecting laterally outwardly from opposite sides of the blade at the intersection of the wedge with the bottom of the blade,
   said wings commencing at said point and progressively increasing in width as the rear of the blade is approached until terminating at said rear of the blade,
   said wings widening at a faster rate than said wedge as the rear of the blade is approached whereby to overhang and project laterally outwardly beyond the wedge to a progressively increasing extent as the rear of the blade is approached; and
   a pair of closing fins projecting laterally outwardly from opposite sides of the blade above said wings,
   each of said fins having a downwardly and rearwardly inclined lower surface above the upper surface of the corresponding wing,
   each of said fins being of generally concavo-convex configuration with said lower surfaces thereof concave and top surfaces thereof convex.

9. In a subsoil applicator knife, the improvement comprising:
   an elongated blade having a normally upwardly and rearwardly inclined longitudinal axis and a soil-slicing, longitudinally extending line edge along the front thereof with respect to the normal path of travel of the knife,
   said blade being provided with a pair of opposite sides which initially mutually diverge from said edge along the length of the latter and then extend generally predominately fore-and-aft as the rear of the blade is approached;
   a soil-penetrating point on said blade at the lowermost and forwardmost extremity of said edge;
   an elongated, soil-firming wedge along the bottom of said blade and integral with the latter,
   said wedge commencing at said point and progressively increasing in width as the rear of the blade is approached until terminating at a rearward location disposed forwardly of the rear of the blade, said wedge having a pair of laterally opposite, triangular faces converging forwardly to said point and converging downwardly and inwardly to a common, lowermost, soil-creasing, fore-and-aft extending edge; and a pair of elongated, fore-and-aft extending wings projecting laterally outwardly from opposite sides of the blade at the intersection of the wedge with the bottom of the blade, said wings commencing at said point and progressively increasing in width as the rear of the blade is approached until terminating at said rear of the blade, said wings widening at a faster rate than said wedge as the rear of the blade is approached whereby to overhang and project laterally outwardly beyond the wedge to a progressively increasing extent as the rear of the blade is approached, each of said wings presenting upright, outermost side margins, each of said wings presenting an upwardly and rearwardly inclined upper surface with a downturned rear portion, each of said wings presenting a bottom surface which merges with the bottom surface of the other wing to form a single common bottom surface across the knife in regions rearwardly of said wedge.

10. In a subsoil knife as claimed in claim 9, wherein said bottom surface of each of said wings is generally flat and intersects with the corresponding triangular face of the wedge along the length of the latter.

11. In a subsoil knife as claimed in claim 10, wherein each of said wings progressively increases in thickness as the rear of the blade is approached.

12. In a subsoil knife as claimed in claim 11, wherein said upper surface of each of said wings is generally flat, and triangular and has a normally downwardly and forwardly inclined line of intersection with the corresponding side of the blade.

13. In a subsoil knife as claimed in claim 9, wherein said wings widen progressively rearwardly at an included angle of approximately 30°.

14. In a subsoil knife as claimed in claim 9; and a pair of closing fins projecting laterally outwardly from opposite sides of the blade above said wings.

15. In a subsoil knife as claimed in claim 14, wherein said wings progressively widen rearwardly at an included angle of approximately 22°.

16. In a subsoil knife as claimed in claim 14, wherein each of said fins has a downwardly and rearwardly inclined lower surface above the upper surface of the corresponding wing.

17. In a subsoil knife as claimed in claim 16, wherein said lower surface of each fin commences at a location spaced rearwardly from said front edge of the blade and slightly forwardly of the rearward termination of said upper surface of the corresponding wing.

18. In a subsoil knife as claimed in claim 17, wherein said fins have laterally outermost side margins which diverge laterally outwardly from opposite sides of the blade as the rear of the blade is approached, said side margins of the fins having portions thereof which are disposed rearwardly of said wings and laterally outwardly beyond the same.

19. In a subsoil knife as claimed in claim 18, wherein said side margins of the fins curve into parallel relationship with one another before the rear of the blade is reached.

* * * * *